(12) United States Patent
Gettens et al.

(10) Patent No.: US 11,590,791 B2
(45) Date of Patent: Feb. 28, 2023

(54) MACHINE-READABLE OPTICAL SECURITY DEVICE

(71) Applicant: Crane & Co., Inc., Boston, MA (US)

(72) Inventors: Nancy J. Gettens, Waban, MA (US); Nicholas G. Pearson, Amherst, NH (US); Eric M. Ziegler, Lexington, MA (US)

(73) Assignee: Crane & Co., Inc., Dalton, MA (US)

( * ) Notice: Subject to any disclaimer, the term of this patent is extended or adjusted under 35 U.S.C. 154(b) by 0 days.

(21) Appl. No.: 15/868,530

(22) Filed: Jan. 11, 2018

(65) Prior Publication Data

US 2018/0229536 A1   Aug. 16, 2018

Related U.S. Application Data (60) Provisional application No. 62/457,226, filed on Feb. 10, 2017.

(51) Int. Cl.
*B42D 25/378* (2014.01)
*B42D 25/382* (2014.01)
(Continued)

(52) U.S. Cl.
CPC .......... *B42D 25/355* (2014.10); *B42D 25/29* (2014.10); *B42D 25/373* (2014.10);
(Continued)

(58) Field of Classification Search
CPC ... B42D 25/378; B42D 25/382; B42D 25/387
(Continued)

(56) References Cited

U.S. PATENT DOCUMENTS

| 992,151 A | 5/1911 | Berthon |
|---|---|---|
| 1,824,353 A | 9/1931 | Jensen |

(Continued)

FOREIGN PATENT DOCUMENTS

| AU | 2009278275 B2 | 7/2012 |
|---|---|---|
| CA | 2741298 A1 | 4/2010 |

(Continued)

OTHER PUBLICATIONS

Phthalocyanine: Applications https://en.wikipedia.org/wiki/Phthalocyanine (13); Dahlen, Miles A. (Sep. 1, 1939). The Phthalocyanines A New Class of Synthetic Pigments and Dyes (Year: 1939).*

(Continued)

*Primary Examiner* — Kyle R Grabowski (57) ABSTRACT

An IR and/or UV machine-readable optical security device (e.g., micro-optic security thread) that is made up of at least one IR-absorbing component with a characteristic IR signature detectable at two or more IR-wavelengths, at least one UV-absorbing component with a characteristic UV signature detectable at two or more UV-wavelengths, at least one IR-absorbing component that absorbs IR light and emits light at a different invisible wavelength, at least one UV-absorbing component that absorbs UV light and emits light at a different invisible wavelength, or a combination thereof, is provided. The IR and UV machine-readable features do not interfere with the optical effects projected by the optical material.

13 Claims, 4 Drawing Sheets

(51) Int. Cl.
  *B42D 25/387* (2014.01)
  *B42D 25/355* (2014.01)
  *B42D 25/29* (2014.01)
  *B42D 25/45* (2014.01)
  *B42D 25/373* (2014.01)
  *G06K 7/12* (2006.01)
  *B42D 25/324* (2014.01)
  *B42D 25/24* (2014.01)

(52) U.S. Cl.
  CPC ......... *B42D 25/378* (2014.10); *B42D 25/382* (2014.10); *B42D 25/387* (2014.10); *B42D 25/45* (2014.10); *G06K 7/12* (2013.01); *B42D 25/24* (2014.10); *B42D 25/324* (2014.10)

(58) Field of Classification Search
  USPC ........................................................ 235/491
  See application file for complete search history.

(56) References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz et al. |
| 3,241,429 A | 3/1966 | Rice et al. |
| 3,264,164 A | 8/1966 | Jerothe et al. |
| 3,312,006 A | 4/1967 | Rowland |
| 3,357,772 A | 12/1967 | Rowland |
| 3,357,773 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,801,183 A | 4/1974 | Sevelin et al. |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,519,632 A | 5/1985 | Parkinson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,044,707 A | 9/1991 | Mallik |
| 5,074,649 A | 12/1991 | Hamanaka |
| 5,085,514 A | 2/1992 | Mallik et al. |
| 5,135,262 A | 8/1992 | Smith et al. |
| 5,142,383 A | 8/1992 | Mallik |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 5,282,650 A | 2/1994 | Smith et al. |
| 5,359,454 A | 10/1994 | Steenblik et al. |
| 5,384,861 A | 1/1995 | Mattson et al. |
| 5,393,099 A | 2/1995 | D'Amato |
| 5,393,590 A | 2/1995 | Caspari |
| 5,413,839 A | 5/1995 | Chatwin et al. |
| 5,433,807 A | 7/1995 | Heckenkamp et al. |
| 5,438,928 A | 8/1995 | Chatwin et al. |
| 5,442,482 A | 8/1995 | Johnson et al. |
| 5,449,200 A | 9/1995 | Andric et al. |
| 5,460,679 A | 10/1995 | Abdel-Kader |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,503,902 A | 4/1996 | Steenblik et al. |
| 5,538,753 A | 7/1996 | Antes et al. |
| 5,543,942 A | 8/1996 | Mizuguchi et al. |
| 5,555,476 A | 9/1996 | Suzuki et al. |
| 5,567,276 A | 10/1996 | Boehm et al. |
| 5,568,313 A | 10/1996 | Steenblik et al. |
| 5,574,083 A | 11/1996 | Brown et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,670,096 A | 9/1997 | Lu |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima et al. |
| 5,731,064 A | 3/1998 | Suss |
| 5,737,126 A | 4/1998 | Lawandy |
| 5,753,349 A | 5/1998 | Boswell |
| 5,759,683 A | 6/1998 | Boswell |
| 5,763,349 A | 6/1998 | Zandona |
| 5,783,017 A | 7/1998 | Boswell |
| 5,783,275 A | 7/1998 | Muck et al. |
| 5,800,907 A | 9/1998 | Yumoto |
| 5,810,957 A | 9/1998 | Boswell |
| 5,812,313 A | 9/1998 | Johansen et al. |
| 5,886,798 A | 3/1999 | Staub et al. |
| 5,933,276 A | 8/1999 | Magee |
| 5,949,420 A | 9/1999 | Terlutter |
| 5,995,638 A | 11/1999 | Amidror et al. |
| 6,030,691 A | 2/2000 | Burchard et al. |
| 6,036,230 A | 3/2000 | Farber |
| 6,036,233 A | 3/2000 | Braun et al. |
| 6,060,143 A | 5/2000 | Tompkin et al. |
| 6,084,713 A | 7/2000 | Rosenthal |
| 6,089,614 A | 7/2000 | Howland et al. |
| 6,106,950 A | 8/2000 | Searle et al. |
| 6,144,795 A | 11/2000 | Dawes et al. |
| 6,176,582 B1 | 1/2001 | Grasnick |
| 6,177,953 B1 | 1/2001 | Vachette et al. |
| 6,179,338 B1 | 1/2001 | Bergmann et al. |
| 6,195,150 B1 | 2/2001 | Silverbrook |
| 6,249,588 B1 | 6/2001 | Amidror et al. |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florczak et al. |
| 6,297,911 B1 | 10/2001 | Nishikawa et al. |
| 6,301,363 B1 | 10/2001 | Mowry, Jr. |
| 6,302,989 B1 | 10/2001 | Kaule |
| 6,328,342 B1 | 12/2001 | Belousov et al. |
| 6,329,040 B1 | 12/2001 | Oshima et al. |
| 6,329,987 B1 | 12/2001 | Gottfried et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |

(56) References Cited

U.S. PATENT DOCUMENTS

| | | |
|---|---|---|
| 6,373,965 B1 | 4/2002 | Liang |
| 6,381,071 B1 | 4/2002 | Dona et al. |
| 6,396,636 B2 | 5/2002 | Sawaki et al. |
| 6,404,555 B1 | 6/2002 | Nishikawa |
| 6,405,464 B1 | 6/2002 | Gulick, Jr. et al. |
| 6,414,794 B1 | 7/2002 | Rosenthal |
| 6,424,467 B1 | 7/2002 | Goggins |
| 6,433,844 B2 | 8/2002 | Li |
| 6,450,540 B1 | 9/2002 | Kim |
| 6,467,810 B2 | 10/2002 | Taylor et al. |
| 6,473,238 B1 | 10/2002 | Daniell |
| 6,483,644 B1 | 11/2002 | Gottfried et al. |
| 6,500,526 B1 | 12/2002 | Hannington |
| 6,521,324 B1 | 2/2003 | Debe et al. |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,618,201 B2 | 9/2003 | Nishikawa et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,926,764 B2* | 8/2005 | Bleikolm ............... B41M 3/14 106/31.27 |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,333,268 B2 | 2/2008 | Steenblik et al. |
| 7,336,422 B2 | 2/2008 | Dunn et al. |
| 7,359,120 B1 | 4/2008 | Raymond et al. |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,468,842 B2 | 12/2008 | Steenblik et al. |
| 7,504,147 B2 | 3/2009 | Hannington |
| 7,545,567 B2 | 6/2009 | Tomczyk |
| 7,609,450 B2 | 10/2009 | Niemuth |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,719,733 B2 | 5/2010 | Schilling et al. |
| 7,738,175 B2 | 6/2010 | Steenblik et al. |
| 7,744,002 B2 | 6/2010 | Jones et al. |
| 7,751,608 B2 | 7/2010 | Hersch et al. |
| 7,762,591 B2 | 7/2010 | Schilling et al. |
| 7,763,179 B2 | 7/2010 | Levy et al. |
| 7,812,935 B2 | 10/2010 | Cowburn et al. |
| 7,820,269 B2 | 10/2010 | Staub et al. |
| 7,830,627 B2 | 11/2010 | Commander et al. |
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,111,463 B2 | 2/2012 | Endle et al. |
| 8,149,511 B2 | 4/2012 | Kaule et al. |
| 8,241,732 B2 | 8/2012 | Hansen et al. |
| 8,284,492 B2 | 10/2012 | Crane et al. |
| 8,367,452 B2 | 2/2013 | Soma et al. |
| 8,514,492 B2 | 8/2013 | Schilling et al. |
| 8,528,941 B2 | 9/2013 | Dorfler et al. |
| 8,537,470 B2 | 9/2013 | Endle et al. |
| 8,557,369 B2 | 10/2013 | Hoffmuller et al. |
| 8,693,101 B2 | 4/2014 | Tomczyk et al. |
| 8,739,711 B2 | 6/2014 | Cote |
| 8,867,134 B2 | 10/2014 | Steenblik et al. |
| 8,908,276 B2 | 12/2014 | Holmes |
| 9,019,613 B2 | 4/2015 | Raymond et al. |
| 9,132,690 B2 | 9/2015 | Raymond et al. |
| 9,592,700 B2 | 3/2017 | Raymond et al. |
| 9,701,150 B2 | 7/2017 | Raymond et al. |
| 9,802,437 B2 | 10/2017 | Holmes |
| 2001/0048968 A1 | 12/2001 | Cox et al. |
| 2002/0014967 A1 | 2/2002 | Crane et al. |
| 2002/0114078 A1 | 8/2002 | Halle et al. |
| 2002/0167485 A1 | 11/2002 | Hedrick |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0157211 A1 | 8/2003 | Tsunetomo et al. |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0020086 A1 | 2/2004 | Hudson |
| 2004/0022967 A1 | 2/2004 | Lutz et al. |
| 2004/0065743 A1 | 4/2004 | Doublet |
| 2004/0100707 A1 | 5/2004 | Kay et al. |
| 2004/0140665 A1 | 7/2004 | Scarbrough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2005/0247794 A1 | 11/2005 | Jones et al. |
| 2006/0003295 A1 | 1/2006 | Hersch et al. |
| 2006/0011449 A1 | 1/2006 | Knoll |
| 2006/0017979 A1 | 1/2006 | Goggins |
| 2006/0018021 A1 | 1/2006 | Tomkins et al. |
| 2006/0061267 A1 | 3/2006 | Yamasaki et al. |
| 2006/0227427 A1 | 10/2006 | Dolgoff |
| 2007/0058260 A1 | 3/2007 | Steenblik et al. |
| 2007/0092680 A1 | 4/2007 | Chaffins et al. |
| 2007/0164555 A1 | 7/2007 | Mang et al. |
| 2007/0183045 A1 | 8/2007 | Schilling et al. |
| 2007/0183047 A1 | 8/2007 | Phillips et al. |
| 2007/0246543 A1 | 10/2007 | Jones et al. |
| 2007/0273143 A1* | 11/2007 | Crane ............... B42D 25/00 283/72 |
| 2007/0284546 A1 | 12/2007 | Ryzi et al. |
| 2007/0291362 A1 | 12/2007 | Hill et al. |
| 2008/0116272 A1* | 5/2008 | Giering ............... B42D 25/29 235/439 |
| 2008/0130018 A1 | 6/2008 | Steenblik et al. |
| 2008/0143095 A1 | 6/2008 | Isherwood et al. |
| 2008/0160226 A1 | 7/2008 | Kaule et al. |
| 2008/0182084 A1 | 7/2008 | Tompkin et al. |
| 2009/0008923 A1 | 1/2009 | Kaule et al. |
| 2009/0045617 A1 | 2/2009 | Lawandy et al. |
| 2009/0061159 A1 | 3/2009 | Staub et al. |
| 2009/0243278 A1 | 10/2009 | Camus et al. |
| 2009/0261572 A1 | 10/2009 | Bleikolm et al. |
| 2009/0290221 A1* | 11/2009 | Hansen ............... B42D 25/29 359/619 |
| 2009/0310470 A1 | 12/2009 | Yrjonen |
| 2009/0315316 A1 | 12/2009 | Staub et al. |
| 2010/0001508 A1 | 1/2010 | Tompkin et al. |
| 2010/0018644 A1 | 1/2010 | Sacks et al. |
| 2010/0045024 A1 | 2/2010 | Attner et al. |
| 2010/0068459 A1 | 3/2010 | Wang et al. |
| 2010/0084851 A1 | 4/2010 | Schilling |
| 2010/0103528 A1 | 4/2010 | Endle et al. |
| 2010/0109317 A1 | 5/2010 | Hoffmuller et al. |
| 2010/0177094 A1 | 7/2010 | Kaule et al. |
| 2010/0182221 A1 | 7/2010 | Kaule et al. |

(56) References Cited

U.S. PATENT DOCUMENTS

| | | |
|---|---|---|
| 2010/0194532 A1 | 8/2010 | Kaule |
| 2010/0208036 A1 | 8/2010 | Kaule |
| 2010/0277805 A1 | 11/2010 | Schilling et al. |
| 2010/0308571 A1 | 12/2010 | Steenblik et al. |
| 2010/0328922 A1 | 12/2010 | Peters et al. |
| 2011/0017498 A1 | 1/2011 | Lauffer et al. |
| 2011/0019283 A1 | 1/2011 | Steenblik et al. |
| 2011/0045255 A1 | 2/2011 | Jones et al. |
| 2011/0056638 A1 | 3/2011 | Rosset |
| 2011/0179631 A1 | 7/2011 | Gates et al. |
| 2012/0019607 A1 | 1/2012 | Dunn et al. |
| 2012/0033305 A1 | 2/2012 | Moon et al. |
| 2012/0091703 A1 | 4/2012 | Maguire et al. |
| 2012/0098249 A1 | 4/2012 | Rahm et al. |
| 2012/0105928 A1 | 5/2012 | Camus et al. |
| 2012/0153607 A1 | 6/2012 | Rahm et al. |
| 2012/0194916 A1 | 8/2012 | Cape et al. |
| 2012/0243744 A1 | 9/2012 | Camus et al. |
| 2013/0003354 A1 | 1/2013 | Meis et al. |
| 2013/0010048 A1 | 1/2013 | Dunn et al. |
| 2013/0038942 A1 | 2/2013 | Holmes |
| 2013/0044362 A1 | 2/2013 | Commander et al. |
| 2013/0154250 A1 | 6/2013 | Dunn et al. |
| 2013/0154251 A1 | 6/2013 | Jolic |
| 2014/0174306 A1 | 6/2014 | Wening et al. |
| 2014/0175785 A1 | 6/2014 | Kaule et al. |
| 2014/0353959 A1 | 12/2014 | Lochbihler |
| 2014/0367957 A1 | 12/2014 | Jordan |
| 2014/0376091 A1 | 12/2014 | Jordan et al. |
| 2015/0152602 A1 | 6/2015 | Blake et al. |
| 2016/0101643 A1 | 4/2016 | Cape et al. |
| 2016/0176221 A1 | 6/2016 | Holmes |
| 2016/0257159 A1 | 9/2016 | Attner et al. |
| 2016/0325577 A1 | 11/2016 | Jordan |
| 2017/0015129 A1 | 1/2017 | Jordan |
| 2017/0173990 A1* | 6/2017 | Cape .................... B42D 25/324 |
| 2018/0178577 A1* | 6/2018 | Lister .................. B42D 25/378 |

FOREIGN PATENT DOCUMENTS

| | | | |
|---|---|---|---|
| CN | 1102865 A | 5/1995 | |
| CN | 1126970 C | 11/2003 | |
| CN | 1578817 A | 2/2005 | |
| CN | 1799072 A | 7/2006 | |
| CN | 1950570 A | 4/2007 | |
| CN | 101076835 A | 11/2007 | |
| CN | 101443692 A | 5/2009 | |
| CN | 101678664 A | 3/2010 | |
| CN | 103228458 A | 7/2013 | |
| CN | 106163822 A | 11/2016 | |
| DE | 19804858 A1 | 8/1999 | |
| DE | 19932240 A1 | 1/2001 | |
| DE | 10100692 B4 | 8/2004 | |
| DE | 102011115125 A1 | 4/2013 | |
| EP | 90130 A1 | 10/1983 | |
| EP | 92691 A2 | 11/1983 | |
| EP | 118222 A1 | 9/1984 | |
| EP | 156460 A1 | 10/1985 | |
| EP | 203752 A2 | 12/1986 | |
| EP | 253089 A1 | 1/1988 | |
| EP | 318717 A2 | 6/1989 | |
| EP | 415230 A2 | 3/1991 | |
| EP | 439092 A2 | 7/1991 | |
| EP | 319157 B1 | 7/1992 | |
| EP | 801324 A1 | 10/1997 | |
| EP | 887699 A1 | 12/1998 | |
| EP | 930174 A2 | 7/1999 | |
| EP | 1356952 A2 | 10/2003 | |
| EP | 1002640 B1 | 5/2004 | |
| EP | 997750 B1 | 5/2005 | |
| EP | 1538554 A2 | 6/2005 | |
| EP | 1354925 B1 | 4/2006 | |
| EP | 1659449 A2 | 5/2006 | |
| EP | 1743778 A2 | 1/2007 | |
| EP | 1801636 A1 | 6/2007 | |
| EP | 1876028 A1 | 1/2008 | |
| EP | 1897700 A2 | 3/2008 | |
| EP | 1931827 B1 | 4/2009 | |
| EP | 2335937 A1 | 6/2011 | |
| EP | 2338682 A1 | 6/2011 | |
| EP | 2162294 B1 | 3/2012 | |
| FR | 2803939 A1 | 7/2001 | |
| FR | 2952194 A1 | 5/2011 | |
| FR | 3018474 A1 * | 9/2015 | ........... B42D 25/382 |
| GB | 1095286 A | 12/1967 | |
| GB | 2103669 A | 2/1983 | |
| GB | 2168372 A | 6/1986 | |
| GB | 2227451 A | 8/1990 | |
| GB | 2362493 A | 11/2001 | |
| GB | 2395724 A | 6/2004 | |
| GB | 2433470 A | 6/2007 | |
| GB | 2490780 A | 11/2012 | |
| JP | S41-4953 Y1 | 3/1966 | |
| JP | S46-22600 Y1 | 8/1971 | |
| JP | H04-234699 A | 8/1992 | |
| JP | H05-508119 A | 11/1993 | |
| JP | H10-35083 A | 2/1998 | |
| JP | H10-39108 A | 2/1998 | |
| JP | H11-501590 A | 2/1999 | |
| JP | H11-189000 A | 7/1999 | |
| JP | 2000-056103 A | 2/2000 | |
| JP | 2000-233563 A | 8/2000 | |
| JP | 2000-256994 A | 9/2000 | |
| JP | 2001-055000 A | 2/2001 | |
| JP | 2001-516899 A | 10/2001 | |
| JP | 2001-324949 A | 11/2001 | |
| JP | 2002-169223 A | 6/2002 | |
| JP | 2003-039583 A | 2/2003 | |
| JP | 2003-165289 A | 6/2003 | |
| JP | 2003-528349 A | 9/2003 | |
| JP | 2003-326876 A | 11/2003 | |
| JP | 2004-163530 A | 6/2004 | |
| JP | 2004-262144 A | 9/2004 | |
| JP | 2004-317636 A | 11/2004 | |
| JP | 2005-193501 A | 7/2005 | |
| JP | 2009-536885 A | 10/2009 | |
| JP | 2009-262375 A | 11/2009 | |
| JP | 2009-274293 A | 11/2009 | |
| JP | 2011-502811 A | 1/2011 | |
| JP | 2012-073897 A | 4/2012 | |
| JP | 2016-085760 A | 5/2016 | |
| KR | 10-0194536 B1 | 6/1999 | |
| KR | 20-0217035 Y1 | 3/2001 | |
| KR | 20-0311905 Y1 | 5/2003 | |
| KR | 10-0544300 B1 | 1/2006 | |
| KR | 10-0561321 B1 | 3/2006 | |
| KR | 10-2007-0064611 A | 6/2007 | |
| KR | 10-2008-0048578 A | 6/2008 | |
| KR | 10-2009-0028523 A | 3/2009 | |
| KR | 10-2012-0094743 A | 8/2012 | |
| RU | 2111125 C1 | 5/1998 | |
| RU | 2245566 C2 | 1/2005 | |
| RU | 2292370 C2 | 1/2007 | |
| RU | 2010101854 A | 7/2011 | |
| TW | 575740 B | 2/2004 | |
| WO | WO92008998 A1 | 5/1992 | |
| WO | WO92019994 A1 | 11/1992 | |
| WO | WO93024332 A1 | 12/1993 | |
| WO | WO96035971 A2 | 11/1996 | |
| WO | WO97019820 A1 | 6/1997 | |
| WO | WO97044769 A1 | 11/1997 | |
| WO | WO98013211 A1 | 4/1998 | |
| WO | WO98015418 A1 | 4/1998 | |
| WO | WO98026373 A1 | 6/1998 | |
| WO | WO99014725 A1 | 3/1999 | |
| WO | WO99023513 A1 | 5/1999 | |
| WO | WO99026793 A1 | 6/1999 | |
| WO | WO99066356 A1 | 12/1999 | |
| WO | WO01007268 A1 | 2/2001 | |
| WO | WO01011591 A1 | 2/2001 | |
| WO | WO01039138 A1 | 5/2001 | |
| WO | WO01053113 A1 | 7/2001 | |
| WO | WO01063341 A1 | 8/2001 | |
| WO | WO01071410 A2 | 9/2001 | |

(56) References Cited

FOREIGN PATENT DOCUMENTS

| WO | WO02040291 | A2 | 5/2002 |
|---|---|---|---|
| WO | WO02043012 | A1 | 5/2002 |
| WO | WO02101669 | A2 | 12/2002 |
| WO | WO03005075 | A1 | 1/2003 |
| WO | WO03007276 | A1 | 1/2003 |
| WO | WO03022598 | A2 | 3/2003 |
| WO | WO03053713 | A1 | 7/2003 |
| WO | WO03061980 | A1 | 7/2003 |
| WO | WO03061983 | A1 | 7/2003 |
| WO | WO03082598 | A1 | 10/2003 |
| WO | WO03098188 | A1 | 11/2003 |
| WO | WO2004022355 | A2 | 3/2004 |
| WO | WO2004036507 | A2 | 4/2004 |
| WO | WO2004087430 | A1 | 10/2004 |
| WO | WO2005052650 | A2 | 6/2005 |
| WO | WO2005106601 | A2 | 11/2005 |
| WO | WO2006029744 | A1 | 3/2006 |
| WO | WO2007076952 | A2 | 7/2007 |
| WO | WO2007133613 | A2 | 11/2007 |
| WO | WO2008049632 | A1 | 5/2008 |
| WO | WO2009000527 | A1 | 12/2008 |
| WO | WO2009000528 | A1 | 12/2008 |
| WO | WO2009000529 | A2 | 12/2008 |
| WO | WO2009000530 | A2 | 12/2008 |
| WO | 2009049562 | A2 | 4/2009 |
| WO | WO2009118946 | A1 | 10/2009 |
| WO | WO2009121784 | A2 | 10/2009 |
| WO | WO2010015383 | A1 | 2/2010 |
| WO | WO2010094691 | A1 | 8/2010 |
| WO | WO2010099571 | A1 | 9/2010 |
| WO | WO2010113114 | A2 | 10/2010 |
| WO | WO2010136339 | A2 | 12/2010 |
| WO | WO2011012460 | A2 | 2/2011 |
| WO | WO2011015384 | A1 | 2/2011 |
| WO | WO2011019912 | A1 | 2/2011 |
| WO | WO2011044704 | A1 | 4/2011 |
| WO | WO2011051669 | A1 | 5/2011 |
| WO | WO2011107791 | A1 | 9/2011 |
| WO | WO2011107793 | A1 | 9/2011 |
| WO | WO2011122943 | A1 | 10/2011 |
| WO | WO2012027779 | A1 | 3/2012 |
| WO | WO2012103441 | A1 | 8/2012 |
| WO | WO2012121622 | A1 | 9/2012 |
| WO | WO2013028534 | A1 | 2/2013 |
| WO | WO2013093848 | A1 | 6/2013 |
| WO | WO2013098513 | A1 | 7/2013 |
| WO | WO2015148878 | A2 | 10/2015 |
| WO | WO2016063050 | A1 | 4/2016 |
| WO | WO2016149760 | A1 | 9/2016 |

OTHER PUBLICATIONS https://www.fujifilminkjet.com/uv-ink-part-1-uv-curable-ink-works/ (Year: 2017).*
Amidror, "A Generalized Fourier-Based Method for the Analysis of 2D Moiré Envelope-Forms in Screen Superpositions", Journal of Modern Optics (London, GB), vol. 41, No. 9, Sep. 1, 1994, pp. 1837-1862, ISSN: 0950-0340.
Article: "Spherical Lenses" (Jan. 18, 2009); pp. 1-12; retrieved from the Internet: URL:http://www.physicsinsights.org/simple_optics_spherical_lenses-l.html.
Drinkwater, K. John, et al., "Development and applications of Diffractive Optical Security Devices for Banknotes and High Value Documents", Optical Security and Counterfeit Deterrence Techniques III, 2000, pp. 66-79, SPIE vol. 3973, San Jose, CA.
Dunn, et al., "Three-Dimensional Virtual Images for Security Applications", Optical Security and Counterfeit Deterrence Techniques V, (published Jun. 3, 2004), pp. 328-336, Proc. SPIE 5310.
Fletcher, D.A., et al., "Near-field infrared imaging with a microfabricated solid immersion lens", Applied Physics Letters, Oct. 2, 2000, pp. 2109-2111, vol. 77, No. 14.
Gale, M. T., et al., Chapter 6—Replication, Micro Optics: Elements, Systems and Applications, 1997, pp. 153-177.
Hardwick, Bruce and Ghioghiu Ana, "Guardian Substrate as an Optical Medium for Security Devices", Optical Security and Counterfeit Deterrence Techniques III, 2000, pp. 176-179, SPIE vol. 3973, San Jose, CA.
Helmut Kipphan (ed.), "Section 2.2 Gravure Printing", Handbook of Print Media: Technologies and Production Methods, 2001, pp. 369-371, Heidelberger Druckmaschinen AG, Germany.
Hutley, M.C., et al., "The Moiré Magnifier", Pure Appl. Opt. 3, 1994, pp. 133-142, IOP Publishing Ltd., UK.
Hutley, M.C., "Integral Photography, Superlenses and the Moiré Magnifier", European Optical Society, 1993, pp. 72-75, vol. 2, UK.
Hutley, M., et al., "Microlens Arrays", Physics World, Jul. 1991, pp. 27-32.
Kamal, H., et al., "Properties of Moiré Magnifiers", Opt. Eng., Nov. 1998, pp. 3007-3014, vol. 37, No. 11.
Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.
Lippmann, G., "Photgraphie—Épreuves Réversibles, Photographies Intégrals", Académie des Sciences, 1908, pp. 446-451, vol. 146, Paris.
Liu, S., et al., "Artistic Effects and Application of Moiré Patterns in Security Holograms", Applied Optics, Aug. 1995, pp. 4700-4702, vol. 34, No. 22.
Muke, "Embossing of Optical Document Security Devices", Optical Security and Counterfeit Deterrence Techniques V, (published Jun. 3, 2004), pp. 341-349, Proc. SPIE 5310.
Phillips, Roger W., et al., Security Enhancement of Holograms with Interference Coatings, Optical Security and Counterfeit Deterrence Techniques III, 2000, pp. 304-316, SPIE vol. 3973, San Jose, CA.
Steenblik, Richard A., et al., UNISON Micro-optic Security Film, Optical Security and Counterfeit Deterrence Techniques V, 2004, pp. 321-327, SPIE vol. 5310, San Jose, CA.
Van Renesse, Rudolf L., Optical Document Security, 1993, Artech House Inc., Norwood, MA.
Van Renesse, Rudolf L., Optical Document Security, 1998, 2nd edition, pp. 232-235, 240-241 and 320-321, Artech House Inc., Norwood, MA (ISBN 0-89006-982-4).
Van Renesse, Rudolf L., Optical Document Security, 2005, 3rd edition, pp. 62-169, Artech House Inc., Norwood, MA (ISBN 1-58053-258-6).
Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.
Zhang, X., et al., "Concealed Holographic Coding for Security Applications by Using a Moiré Technique", Applied Optics, Nov. 1997, pp. 8096-8097, vol. 36, No. 31.
European Patent Office, "Communication pursuant to Rules 161(1) and 162 EPC," Application No. EP18703110.9, dated Sep. 19, 2019, 4 pages.
International Search Report and Written Opinion of the International Searching Authority for International Application No. PCT/US2018/013348, dated Mar. 29, 2018, 10 pages.
International Preliminary Report on Patentability for International Application No. PCT/US2018/013348, dated Aug. 13, 2019, 6 pages.
European Patent Office, "Communication pursuant to Rule 94(3) EPC," Application No. EP18703110.9, dated May 20, 2020, 3 pages.
First Office Action dated Oct. 10, 2020 in connection with Chinese Application No. 201880011091.5, 28 pages.
Communication pursuant to Article 94(3) EPC dated Feb. 12, 2021 in connection with European Application No. 18703110.9, 3 pages.
China National Intellectual Property Administration, "The Second Office Action" Application No. CN201880011091.5, dated Jun. 2, 2021, 31 pages.
Intellectual Property India, "Examination report under sections 12 & 13 of the Patents Act, 1970 and the Patents Rules, 2003," Application No. IN201927024749, dated Jun. 30, 2021, 6 pages.

(56) References Cited

OTHER PUBLICATIONS

Russian Federation Federal Service for Intellectual Property (ROSPATENT), "Official Action," Application No. 2019128202/03(055424), dated May 25, 2021, 18 pages.
European Patent Office, "Communication under Rule 71(3) EPC," Application No. EP18703110.9, dated Oct. 12, 2021, 37 pages.
Russian Federal Service for Intellectual Property (ROSPATENT), "Decision to Grant," Application No. RU 2019128202/03(055424), dated Sep. 27, 2021, 16 pages.
Japan Patent Office, "Notice of Reasons for Refusal," Application No. JP 2019-543361, dated Nov. 3, 2021, 13 pages.
IP Australia, "Examination report," Application No. AU 2018218937, dated Jan. 25, 2022, 3 pages.
China National Intellectual Property Administration, "The Third Office Action," Application No. CN 201880011091.5, dated Jan. 6, 2022, 10 pages.
USPTO, "Non-final Office Action," U.S. Appl. No. 17/304,446, dated Feb. 7, 2022, 9 pages.
Korean Intellectual Property Office, "Notification of Reason for Refusal," Application No. KR 10-2019-7024515, dated Mar. 2, 2022, 19 pages.
European Patent Office, "Communication pursuant to Article 94(3) EPC," Application No. EP 18703110.9, dated Feb. 12, 2021, 3 pages.
IP Australia, "Examination report," Application No. AU 2018218937, dated Jun. 6, 2022, 3 pages.
China National Intellectual Property Administration, "Notification to Grant Patent Rights for Invention," Application No. CN 201880011091.5, dated Jun. 6, 2022, 6 pages.
European Patent Office, "European Search Report" Application No. 22159102.7, dated Jun. 7, 2022, 7 pages.
Japan Patent Office, "Decision of Refusal," Application No. JP 2019-543361, dated May 10, 2022, 10 pages.
Notice of acceptance of patent application dated Aug. 30, 2022 in connection with Australian Patent Application No. 2018218937, 3 pages.
Notice of Allowance dated Oct. 12, 2022 in connection with Korean Patent Application No. 10-2019-7024515, 3 pages.
Substantive Requirement dated Nov. 9, 2022, in connection with Mexican Application No. MX/a/2019/009459, 6 pages.

\* cited by examiner

MACHINE-READABLE OPTICAL SECURITY DEVICE

RELATED APPLICATION

This application claims priority to U.S. Provisional Patent Application Serial No. 62/457,226, filed Feb. 10, 2017, which is incorporated herein in its entirety by reference.

TECHNICAL FIELD

The present invention generally relates to a machine-readable optical security device (MrOSD) that is suitable for use in securing (i.e., authenticating and/or aestheticizing) high security products such as high value articles of manufacture or high value documents. The MrOSD includes an optical security device (OSD) coupled to a Mr-component having a characteristic machine readable, signature (Mr-signature) such as an infrared (IR) and/or ultraviolet (UV) signature, which may also be visible in reflection or in transmission. The Mr-component imparts a characteristic Mr-signature to the OSD such that the OSD, when coupled along with the Mr-component to a high security product, is identifiable by a signature detector. As such, when the MrOSD is coupled to a high security product, such as a banknote, the signature detector can thereby identify the presence/absence of the OSD and thereby authenticate the high security product. The OSD is a transparent/translucent micro-optic security device through which the signature of the Mr-component can be read by the signature detector.

BACKGROUND

Optical materials are often employed to authenticate banknotes and other high security products and to provide visual enhancement of manufactured articles and packaging. Such materials have evolved mainly from a drive to resist counterfeiting, of certain high value documents or high value articles and/or to render such counterfeiting attempts obvious. Examples of optical materials used in anti-counterfeiting applications include image systems that rely on arrays of lenticular or cylindrical structures or arrays of microlenses to project images that exhibit one or more mobile effects when the optical materials are viewed from varying points of view. Because of these mobile effects, the projected images cannot be effectively reproduced using traditional or contemporary printing and/or photocopying processes.

Optical materials based upon the concept of moiré magnification have been and are currently used in anti-counterfeiting applications. Such materials are typically multi-layered materials that include a lens layer containing an array of lenses, an intermediate spacer layer, and an image layer, which contains an array of image elements (i.e., image icons). The lens layer may be located above or below the image layer (i.e., refractive or reflective optical materials, respectively). The image icons are magnified or otherwise optically altered when viewed through the lenses. Alternative optical materials do not include an optical spacer.

For refractive optical materials, an upper lens layer and a image layer are configured such that when the icons are viewed through the upper lens layer one or more images are projected. These projected images may show a number of different mobile effects when the optical material is viewed from varying points of view (i.e., upon tilting of the optical material).

Multi-layered constructions of optical materials conforming to the above descriptions, which are capable of presenting such effects are described in: U.S. Pat. No. 7,333,268 to Steenblik et al.; U.S. Pat. No. 7,468,842 to Steenblik et al; U.S. Pat. No. 7,738,175 to Steenblik et al.; U.S. Pat. No. 7,830,627 to Commander et al.; U.S. Pat. No. 8,149,511 to Kaule et al.; U.S. Pat. No. 8,878,844 to Kaule et al.; U.S. Pat. No. 8,786,521 to Kaule et al.; European Patent No. 2162294 to Kaule et al.; European Patent No. EP2164713 to Kaule et al.; U.S. Pat. No. 8,867,134 to Steenblik et al.; and U.S. Patent Application Publication No. 2014-0376091 A1 to Jordan et al.

Optical materials based upon the concept of moiré magnification may also constitute a single layer system such as those described in U.S. patent application Ser. Nos. 15/215,952 and 15/216,286 to Gregory R. Jordan, both filed Jul. 21, 2016, and in U.S. patent application Ser. No. 14/975,048 to Cape et al., filed Dec. 18, 2015.

These single layer systems can comprise a surface and a periodic array of image relief microstructures having a periodic surface curvature disposed on or within the surface. The image relief microstructures can have a first image repeat period along a first image reference axis within the array, and the periodic surface curvature can have a first curvature repeat period along a first curvature reference axis within the array. Transmission of light through the array, reflection of light from the array, or a combination thereof forms a magnified moiré image.

The image relief microstructures can be (+)-relief or (−)-relief image relief microstructures. In some cases, the image relief microstructures can be (+)-relief image relief microstructures that upwardly project from the surface terminating in an arcuate image generating surface. In other cases, the image relief microstructures can be (−)-relief image relief microstructures that are voids formed within the surface terminating in an arcuate image generating surface. Depending on the desired appearance of the magnified moiré image, the image relief microstructures can be a positive image representation or a negative image representation.

The above-described optical materials can be utilized in a variety of different forms (e.g., strips, patches, security threads, planchettes) with any product and in particular with any security product (e.g., high security products or high value products) such as banknotes, checks, stamps, government letterheads, stock certificates, lottery tickets, other secure documents and other high value or secure commercial products, apparel, identification, passports and other government issued documents, product packaging, or the like, for authentication or aestheticizing purposes. For banknotes and secure documents, these materials are typically used in the form of a strip, patch, or thread and can be fully or partially embedded within the banknote or document, or applied to a surface thereof. For passports or other identification (ID) documents, these materials could be used as a full laminate or inlayed in a surface thereof. For product packaging, these materials are typically used in the form of a label, seal, or tape and are applied to a surface thereof.

It has long been recognized that the use of machine testable security features with security devices used on or within a security document or article offer a heightened level of security. In fact, many security products, such as secured documents, include a security device (e.g., security thread) that is disposed on or within the paper, includes one or more machine detectable/readable (Mr-) security features, such as magnetic features that serve to authenticate the security paper and prevent or deter counterfeiting. For example, in GB 2,227,451 B, a security device in the form of a security thread comprises a plastic strip. Along a surface of the plastic strip is a coating of metal and a machine readable, discontinuous track of magnetic material, which is divided into machine-readable word and termination segments.

The above-described optical materials, however, are incompatible with conventional magnetics. Magnetic materials have a degree of inherent color, which renders them visually detectable in reflected and transmitted light and thus interfere with the projected optical images and their corresponding mobile effects. This is particularly true where the magnetic color is different from the pigments used in certain micro-optic materials as contrasting materials. Moreover, other conventional security threads, patches or stripes include materials that obstruct their machine readability. For example, many of these security devices are opaque or include certain materials, such as metals or demetalized areas that interfere with the machine readability of the machine readable components. For these reasons, heretofore it has been impractical to incorporate certain machine readable features into security devices for high value documents or high value articles.

A need therefore exists for an optical material, such as a micro-optic security device, that employs a machine detectable and/or readable feature that does not interfere with the optical effects projected by the optical material and where the optical security device does not interfere with the machine-readable signature.

SUMMARY OF THE INVENTION

The present invention provides such a machine-readable optical security device (MrOSD) by avoiding at least one of the above impediments to incorporating a machine readable component into an optical security device. In a particular aspect the present invention provides an MrOSD. In one embodiment of this aspect, the MrOSD comprises an OSD component; and an Mr-component coupled to the OSD and imparting a characteristic machine-readable Mr-signature to the OSD; wherein the Mr-signature displays at least one machine readable Mr-signal within the invisible spectral range; wherein the OSD is transparent or translucent; and wherein the Mr-signature is readable, through the OSD, by a signature detector. In another embodiment, the MrOSD is an IR and/or UV machine-readable optical security device (e.g., micro-optic security thread) that comprises at least one of (i) a first IR-component having a characteristic signature (e.g., IR signature) that is detectable at two or more wavelengths (i.e., IR-wavelengths), (ii) a first. UV-component having a characteristic signature (e.g., UV signature) detectable at two or more wavelengths (e.g., UV-wavelengths), (iii) a second IR-component that absorbs IR light and emits light at a different invisible wavelength, and (iv) a second UV-component that absorbs UV light and emits light at a different invisible wavelength.

In another aspect, the present invention provides a method of making an MrOSD. In one particular embodiment of this aspect, this method comprises (i) forming an OSD where the OSD at least comprises (a) a focusing layer of focusing elements, (b) an image layer of image elements disposed relative to the focusing layer such that a synthetic image is projected by the OSD when the image elements are viewed through the focusing elements; and optionally (c) at least one additional layer coupled to at least one of the focusing layer or the image layer and (ii) coupling an Mr-component to the OSD such that the Mr-component imparts a characteristic machine-readable Mr-signature to the OSD; where the Mr-signature displays at least one machine readable Mr-signal within the invisible spectral range; wherein the OSD is transparent or translucent; and wherein the Mr-signature is readable, through the OSD, by a signature detector. In another particular embodiment of aspect, this method comprises (i) forming an OSD where the OSD at least comprises (a) a focusing layer of focusing elements, (b) an image layer of image elements disposed relative to the focusing layer such that a synthetic image is projected by the OSD when the image elements are viewed through the focusing elements, and optionally (c) at least one additional layer coupled to at least one of the focusing layer or the image layer and (ii) introducing (e.g., coupling) at least one Mr-component to the OSD. For this method, the Mr-component is as described above.

In another aspect, the present invention provides a secured product. In one particular embodiment, the secured product comprises an MrOSD, as described herein, wherein the MrOSD is coupled to a substrate of a high security product. In another aspect, the present invention provides a use for the MrOSD. In one particular embodiment, this use comprises using the MrOSD to secure a high security product, wherein the MrOSD is as described herein throughout.

In another aspect, the present invention provides a sheet material and a base platform that are made from or employ the inventive MrOSD, as well as documents made from these materials.

In a particular embodiment of the aspects of the invention presented above, the optical security device of the present invention is a micro-optic security device (MOSD), such as a security thread, that comprises an IR-component with an IR signature that is detectable at two IR-wavelengths, where the ratio of absorption between the two IR-wavelengths is reliably and measurably the same when measured in transmission.

In another exemplary embodiment, the OSD of the MrOSD is a micro-optic security device (e.g., security thread) that comprises an IR-absorbing component that absorbs IR light and emits light at a different invisible wavelength and/or a UV-absorbing component that absorbs UV light and emits light at a different invisible wavelength (e.g., IR and/or UV phosphors). The emitted light may be viewed from the same side as the incident light or from an opposite side of the device.

In view of the present disclosure, various other aspects, embodiments, features and advantages of the invention will, in hindsight, be apparent to a person having ordinary skills in the art (PHOSITA).

BRIEF DESCRIPTION OF THE DRAWINGS

Particular features of the disclosed invention are illustrated by reference to the accompanying drawings in which.

DETAILED DESCRIPTION OF THE INVENTION

Definitions

The term "characteristic signature", as used herein is intended to mean a unique absorption or transmission (absorption/transmission) pattern, such as that depicted on a spectrogram of a material that is exposed to electromagnetic radiation like IR or UV. This unique pattern may include unique slopes, peaks along a wavelength/frequency scale correlating to particular spectral absorption/transmission curves, or other predetermined identifying spectral characteristics such as the width of two or more absorption/transmission peaks, the height to width relationship of two or more peaks, the ratio of absorption/transmission (height) between two absorption/transmission peaks, or changes in the curvature of the spectrum. These can include absorption/transmission maxima (peaks) and/or absorption/transmission minima and/or absorption/transmission edges at substantially the same wavelengths.

The term "coupling" or "couple", as used herein, is intended to mean that the component is either directly or indirectly secured to another component.

The term "detectable", as used herein, is intended to mean reliably measurable IR and/or UV absorbance (or transmittance) at two or more wavelengths using a detector that reacts to IR and/or UV radiation, when the inventive optical security device is present on or partially within a paper or polymer sheet material.

The term "imparting", as used herein, is to be understood as adding to or enabling the OSD to be authenticated/identified, or its presence or absence to be determined, by the presence or absence of the Mr-signature The term "integrated", as used herein, refers to the incorporation of the Mr-component into a layer or array of the OSD by, for example, having the Mr-component distributed in the formulation used to prepare the OSD layer.

The term "intermittent pattern", as used herein, is intended to mean that when viewed (by machine or with a viewer that images at the appropriate wavelength) in IR or UV illumination, an optionally repeating pattern (e.g., an encoded pattern) may be seen on the micro-optic security device.

The term "integration" or "integrating", as used herein, is intended to mean that the subject component is added to at least a bulk portion of another component of the invention.

The term "introducing", as used herein, is intended to mean that the subject component is added to another component of the invention by integration or layering.

The term "layering", as used herein, is intended to mean that the subject component is coupled to another component in a continuous or discontinuous layer under or over another referenced component/layer of the invention such that at least one surface of each component is substantially parallel to a surface of the other component/layer.

The term "spectral range", as used herein refers to the relative ranges of wavelengths among the electromagnetic range including, for example, the UV-spectral range, the IR-spectral range, the visible-spectral range, the x-ray-spectral range, etc.

Unless otherwise defined, all technical and scientific terms used herein have the same meaning as commonly understood by a PHOSITA. All publications, patent applications, patents and other references mentioned herein are incorporated by reference in their entirety. In case of conflict, the present specification, including definitions, will control. In addition, the materials, methods, and examples are illustrative only and are not intended to be limiting.

Written Description

As noted above, the present invention may be described in several aspects, including an MrOSD, methods of manufacturing an MrOSD, a secured product comprising an MrOSD, use of an MrOSD in securing certain security products and certain sheet materials, base platforms or documents made from an MrOSD. Particularly, the MrOSD, forming elements of these aspects of the invention, comprises an OSD and an Mr-component that is coupled to the OSD.

The optical security device (OSD) of the present invention is either (a) a multi-layered material or (b) a single-layered material. Exemplary multi-layered materials include those having one or more focusing element layers coupled to one or more image layers. At least one of the focusing element layers includes an array of focusing elements while at least one of the image layers includes an array of image elements. The focusing element layer having the array of focusing elements is layered with the image layer having the array of image elements such that when the image elements are viewed through the focusing elements, from at least one point of view, a synthetic image is projected by the OSD. It is contemplated within the scope of the present invention that the multi-layered material, in certain embodiments, includes additional layers or arrays. For example, in one such embodiment, the OSD further includes an optical spacer layer that is disposed between the image layer and the focusing element layer. Alternatively, where the OSD is a single-layered material, the single-layered construction is made up of a substrate with a surface having a periodic array of image relief microstructures and a periodic surface curvature disposed on or within the surface, which forms a magnified moiré image.

In hindsight from the present disclosure, various suitable OSDs will become apparent to a PHOSITA. For example, certain suitable OSDs are as described in U.S. Pat. No. 7,333,268 to Steenblik et al., U.S. Pat. No. 7,468,842 to Steenblik et al., and U.S. Pat. No. 7,738,175 to Steenblik et al. and these OSDs include focusing element layers formed from a variety of formulation materials such as substantially transparent or clear, colored or colorless polymers such as acrylics, acrylated polyesters, acrylated urethanes, epoxies, polycarbonates, polypropylenes, polyesters, urethanes, and the like, using a multiplicity of methods that are known in the art of micro-optic and microstructure replication, including extrusion (e.g., extrusion embossing, soft embossing), radiation cured casting, and injection molding, reaction injection molding, and reaction casting. High refractive index, colored or colorless materials having refractive indices (at 589 nm, 20° C.) of more than 1.5, 1.6, 1.7, or higher, such as those described in U.S. Patent Application Publication No. US 2010/0109317 A1 to Hoffmuller et al., may also be used in the practice of the present invention. Materials and methods for providing the image layer, spacer layer and additional layers are likewise suitably disclosed in the above incorporated patent documents.

Though various methods of manufacturing the OSD will be apparent in view of the present disclosure, an exemplary method of manufacturing the multi-layered construction comprises forming the image layer by forming an array of image elements, in a radiation cured liquid polymer (e.g., acrylated urethane) that is cast against a base film (i.e., an optical spacer), such as 75 gauge adhesion-promoted polyethylene terephthalate (PET) film; forming the focusing element layer by forming an array of focusing elements in a radiation cured polymer disposed on the opposite face of the base film. Suitable image elements and methods of providing them are described in International Patent Application Publications WO2005/052650, WO2006/125224, WO2008/008635, WO2011/019912, WO2011/163298, WO/2013/028534, WO2014/143980, WO2009/017824, WO2016/044372, WO2016/011249, WO2013/163287, WO2007/133613, WO2012/103441, and WO2015/148878, WO2005/106601, WO2006/087138, which are all incorporated herein in their entirety. In preferred embodiments, the image elements, are in the form of voids, solid regions, protrusions, or any combination thereof. Suitable focusing elements and methods of providing them are described in International Patent Application Publications WO2005/052650, WO2006/125224, WO2008/008635, WO2011/019912, WO2011/163298, WO/2013/028534, WO2014/143980, WO2009/017824, WO2016/044372, WO2016/011249, WO2013/163287, WO2007/133613, WO2012/103441, WO2015/148878, WO2017/105504, WO2005/106601 WO2006/087138, which are all incorporated herein in their entirety, in preferred embodiments, the focusing elements are micro-lenses. The array of focusing elements and the array of image elements are disposed on opposing sides of the base film and are oriented (array alignment or skew) relative to each other such that when the image elements are viewed through the focusing elements a desired synthetic image is projected. Preferably, the image elements are coupled with a contrasting material thereby enhancing the optical effect of the synthetic image. For example, the contrasting material may be coupled to the image elements by coating (e.g., full, partial, or patterned) the front or back of the voids and/or solid regions, by filling the voids, or by coating (e.g., full, partial or patterned) the protrusions. In a preferred embodiment, the image elements are voids that are filled, or substantially filled, with a contrasting material, thereby providing improved contrast between the images projected from the void areas and the surrounding solid regions. Various suitable contrasting materials will be apparent in view of the present disclosure, however Applicant has found it most suitable to use an ink, dye or pigment with sub-micron particle/pigment size. Applying the contrasting material to the image elements may be by gravure-like doctor blading against the film surface, followed by solidifying the filling of contrasting material by suitable means (e.g., solvent removal, radiation curing, or chemical reaction).

Materials, formulations and methods of manufacturing the above-mentioned single-layered construction of the OSD are described in U.S. patent application Ser. Nos. 15/215,952 and 15/216,286, both filed Jul. 21, 2016, and in U.S. patent application Ser. No. 14/975,048, filed Dec. 18, 2015.

The optical security device of the present invention may further comprise additional features and layers, such as those described in U.S. Pat. No. 7,333,268 to Steenblik et at, U.S. Pat. No. 7,468,842 to Steenblik et al., and U.S. Pat. No. 7,738,175 to Steenblik et al. For example, the inventive device may further comprise additional layers (e.g., embedding, sealing or obscuring layers), textured surfaces for better adhesion to further layers, adhesion promoters, etc.

In one such embodiment, the inventive optical security device advantageously contains an obscuring layer on the side of the OSD proximate the image layer of the multi-layer material, or on the backside of the single-layer material, the obscuring layer serving to conceal the device when viewed from the underside of a host sheet material (e.g., a banknote).

The OSD of the present invention is preferably transparent or translucent such that the Mr-component can be readily and/or reliably read by the signature detector through the OSD without the Mr-component interfering (i.e., reducing image resolution, distorting, or blocking) with the synthetic image. As such the layers of the OSD, whether in multi-layered or single-layered construction, must allow such transparency or translucency.

As noted, the MrOSD includes an Mr-component. Various suitable Mr-components will become apparent to a PHOSITA in hindsight of the present disclosure. The Mr-component is coupled with the OSD by integrating one or more of such Mr-components into one or more layers of the inventive MrOSD, or the Mr-component(s) is coupled with the OSD by applying a discrete layer(s) (e.g., Mr-layer) by, for example, coating the Mr-component onto a layer, or between layers, of the OSD or by separately forming an Mr-component layer (e.g., Mr-layer) and subsequently coupling that Mr-layer to the OSD. The Mr-component can be integrated as a mixture, dispersion, solution, emulsion or the like into a layer of the OSD. Other alternative means of integrating the Mr-component with the OSD layer(s) will be apparent, in view of the present disclosure. A discrete layer as used herein is to be understood as a layer that is bordered by a defined interface separating/connecting the OSD layer from/to the Mr-component. Preferably, the Mr-component is a separate layer(s) that is applied or added to the OSD. The Mr-component, whether integrated or discrete, may be present in a continuous fashion (i.e., a solid block) or may be in the form of an intermittent pattern or random distribution. Patterns incorporated herein may provide aesthetics or may provide a unique readable signature. In one embodiment, the pattern is in the form of at least one of horizontal bars, chevrons or zig zags, angled bars, shapes, indicia, or the like, or combinations thereof, and may be visible in reflection, or more likely in transmission at the prescribed wavelengths. Preferably, the pattern is arranged to provide a distinct and recognizable signal when read by a machine. In a particular embodiment, the pattern is a set of equally sized blocks, a set of variable sized blocks, or a set of text.

It is generally contemplated herein that the Mr-component is an ink vehicle and can be incorporated in the various embodiments described herein. Such ink vehicles can be transparent, or pigmented. In one particular embodiment, the MrOSD comprises an OSD coupled to the Mr-component and where the Mr-component is is at least one of an IR-absorbing IR-component and a UV-absorbing UV-component(s). In a further particular embodiment, this Mr-component is in the form of an ink vehicle, and is coupled to the OSD by being mixed in with a formulation used to make an opacifying layer of the OSD. While not always the case it is contemplated herein that the quantity of the Mr-components may be varied, in this particular embodiment, the IR-absorbing or UV-absorbing Mr-component(s) is present in the ink vehicle in a quantity ranging from about 30 to about 70% by wt. A quantity of the ink vehicle ranging from about 30 to about 70% by wt. is added to the formulation used to make the opacifying layer. The thickness of the opacifying layer, in this exemplary embodiment, ranges from about 0.5 to about 5 microns.

In another exemplary embodiment, the Mr-component(s) is applied between the image layer and the opacifying layer of the inventive optical security device.

In yet another exemplary embodiment, the Mr-component(s), in the form of a coating composition, is used to form a layer directly or indirectly on the image layer, which serves to replace the opacifying layer or which constitutes an additional layer(s). A pattern can be formed through the coating process by use of a mask allowing selected intermittent areas to be coated. If applied as a separate layer, the coating composition may be applied between two opacifying layers. The resulting layer may be at least as thick as each opacifying layer.

The various Mr-components are detectable by various means known or apparent to a PHOSITA including various known IR-machines, UV-machines and the like. As noted, the Mr-component may be selected from (i) a first IR-component imparting an Mr-signature to the OSD which includes at least two Mr-signals, that are detectable, at 2 or more wavelengths within the IR spectral range. (ii) a first UV-component imparting an Mr-signature to the OSD which includes at least two Mr-signals, that are detectable, at 2 or more wavelengths within the UV spectral range, (iii) a second IR-component that absorbs IR-light of a first wavelength and emits light at a second different wavelength, and (iv) a second UV-component that absorbs UV-light and emits light at a second a different wavelength. The Mr-signature is a predetermined characteristic set of Mr-signals. These characteristic set of Mr-signals can be detected by, for example, a spectrometer that provides a graphical display of the Mr-signals. These Mr-signals may be plotted on a graph having an x-axis of wavelengths and a y-axis of % transmittance or % absorption over a range of wavelengths and a range of % transmittance/absorption. As such the Mr-signature may include various Mr-signals (peaks, valleys, area under curve, distance between peaks or valleys, slope between particular peaks or valleys, etc.). As noted, the second IR-component absorbs light within the IR-spectral range and emits light at a second and different wavelength. In a preferred embodiment, the second and different wavelength is within a separate invisible spectral range. However, it is also contemplated herein that the second and different wavelength is either in the visible spectral range or is within the same spectral range as the absorption. This is likewise for the second UV-component.

In one embodiment, the MrOSD comprises an OSD component coupled to an Mr-component, as described herein, where the Mr-component is an IR-absorbing IR-component. This IR-component is presented as an ink vehicle having an IR-taggant distributed therein that is detectable at a predetermined wavelength (or set of wavelengths) within the IR-spectral range. Alternatively, the Mr-component is a UV-absorbing UV-component, where said UV-component is presented as an ink vehicle having a UV-taggant distributed therein, that is detectable at a predetermined wavelength (or set of wavelengths) within the UV-spectral range.

Various suitable Mr-components are selected based on the desired predetermined wavelengths at which the Mr-signals are desired. Accordingly, various predetermined wavelengths are contemplated. For example, in certain embodiments where the MrOSD includes a first IR-component and/or a first UV-component, each are independently detectable at 2 or more wavelengths and in a particular embodiment, the IR-component is detectable within a spectral range from about 750 nm to about 850 nm (preferably about 800 nm) (with about 70-80% absorption; preferably 75%) and about 850 nm to about 950 nm (preferably 870 nm-890 nm) (with about 75-80% absorption; preferably about 77-78% absorption) while the UV-component, if present, is detectable at about 10 nm to about 400 nm (preferably about 200-300 nm; preferably 275 nm) (with about 70-80% absorption; preferably 75% absorption) and about 300-400 nm (preferably 350 nm) (with about 75-85% absorption; preferably 80% absorption). In one exemplary embodiment, the Mr-component includes an IR-absorbing component where this component is detectable, by an IR-machine, only in the infrared region of the electromagnetic spectrum or it may be detectable in the infrared region and observable (and possibly also machine detectable) in the visible regions of the spectrum. In a preferred embodiment, the IR-absorbing component is detectable in the near-infrared (MR) region of the electromagnetic spectrum.

The Mr-component in one embodiment is selected from the group of suitable IR-taggants and the group of IR-detectable pigments forming part of an ink vehicle. Suitable pigments and taggants are described in U.S. Pat. No. 6,926,764, which is incorporated herein in its entirety. Accordingly, the ink vehicle can be an ink set comprising a first set of ink including an IR-taggant with a first Mr-signal, and a black, yellow or magenta dye; and a second set of ink including a pigment with a second Mr-signal; wherein the first Mr-signal and the second Mr-signal are substantially the same; and wherein the ink set includes at least two inks of different colors. Preferably the second ink set include cyan having a pigment which provides a Mr-signature with at least one Mr-signal that is substantially the same as at least one Mr-signal provided by the IR-taggant. As such, the substantially the same Mr-signals are within 10 nm of each other. Particularly, in a preferred embodiment, the IR-taggant is a phthalocyanine and preferred pigments are crystallographic X-forms of phthalocyanine. In more preferred embodiments, the IR-taggant is at least one of a substituted phthalocyanine, a naphthalocyanine, a metal-containing phthalocyanine or a poly-substituted phthalocyanine or combinations thereof. Benzenethiol-substituted copper-phthalocyanines are preferred IR-taggants; more preferably para-toluenethiol-persubstituted copper-phthalocyanine of the formula:

In one such embodiment, the IR-absorbing component is an IR-reactive pigment sold as part of an ink or ink vehicle under the trade designation SICPATalk by SICPA SA, Av de Florissant 41, 1008 Prilly, Switzerland. The pigment may be an organometallic pigment such as a metal-containing phthalocyanine pigment which absorbs or reflects more than 75% of any near IR light when viewed in transmission (% T<25% from 750-950 nm), and which is viewable at the following wavelengths: 750 nm and 900 nm. The ratio of absorption between the two IR-wavelengths is equal to about 35 percentage points. This pigment has an off-white body color in the visible region of the electromagnetic spectrum, Suitable IR-absorbing components are described in GB 2,168,372, where certain IR- or UV-absorbing materials that are invisible or transparent in the visible region are disclosed, and in WO 90/1604 where certain IR-taggants are described, which exhibit narrow absorption characteristics; those including rare earth compounds. Other suitable IR-absorbing components are described in EP 553614 where certain phthalocyanines are used as a printing ink and provide spectral absorption in the wavelength range of 700 to about 1200 nm. EP 484018 describes suitable phthalocyanines having absorption wavelengths maximum between about 680 and 900 nm. EP 408191 describes substituted phthalocyanines with characteristic wavelength absorptions in the range of 700 to 1500 nm that are also suitable in the present invention. Naphthalocyanine compounds are also suitable and are described further in EP134518 as IR-absorbers the absorbing near IR (NIR) radiation in the spectral range of 750 to 900nm, which may be used as dyes or pigments.

In another such embodiment, the IR-absorbing component is an IR-reactive pigment sold as part of an ink or ink vehicle under the trade designation LUMOGEN-S by BASF Corporation, 100 Park Ave., Florham Park, N.J. 07932. This pigment is invisible in the visible region of the electromagnetic spectrum.

The ink or ink vehicle may be added to one or more layers of the optical security device, or it may be used to prepare one or more coatings or separate layers that are applied or added to the device. In the above embodiment, the ink vehicle is either mixed in with a composition used to form a pigmented or obscuring layer on the print or object layer, or is used to make a coating or separate layer that is applied or added to the pigmented or obscuring layer.

When the ink vehicle is mixed in with a composition used to from a pigmented or obscuring layer, the pigmented sealing or obscuring layer can be formed using one or more of a variety of opacifying coatings or inks, which include both solvent and solvent-free coatings or inks (both curing and non-curing). In an exemplary embodiment, the sealing or obscuring layer is formed using a pigmented coating comprising a pigment, such as titanium dioxide, dispersed within a binder or carrier of curable polymeric material. Preferably, the sealing or obscuring layer is formed using radiation curable polymers and has a thickness ranging from about 0.5 to about 5 microns.

When used to make a coating or separate layer that is applied or added to the pigmented or obscuring layer, the ink or ink vehicle may be used alone or added to an existing formulation.

In one embodiment, the Mr-signature includes at least two Mr-signals in the invisible spectral range. Here the at least one of the Mr-signal is in the visible and/or uv-spectral range and at least one Mr-signal is in the IR-spectral range. Alternatively, the Mr-signal is in the visible and/or IR-spectral range and at least one Mr-signal is in the UV-spectral range. In a further embodiment, the Mr-signature includes a least one Mr-signal in the near IR-spectral range (NIR).

In one embodiment, the IR-absorber imparts an Mr-signature that includes a first absorption at a first wavelength and a second absorption at a second wavelength where the first absorption is lower than the second absorption and the first wavelength is lower than lower than the second wavelength As such, the slope of the Mr-signature over this wavelength range is a negative slope thereby giving the OSD a characteristic signature readily identifiable and detectable by a signature detector. In a preferred embodiment, this Mr-signature is displayed as a positive slope if the MrOSD is missing, tampered with or is otherwise not authentic.

The invention also provides a secured product comprising the MrOSD, wherein the MrOSD is coupled to a substrate of a high security product. As noted, a high security product includes high value articles and high value documents. The MrOSD may be embedded within the substrate or layered over the surface of the substrate and thereby affixed by a suitable adhesive element. Examples of suitable adhesive elements include pressure, heat or water activated adhesives. Naturally, other adhesive elements will be apparent in view of the present disclosure.

In a preferred embodiment of the secured product, an OSD is at least partially embedded within a paper banknote and the IR-component is present in an amount ranging from about 0.5 gsm to about 5 gsm; more preferably from about 2 gsm to about 3.5 gsm. Applicant has found that surprisingly the emission from the IR-absorbing component is most reliably detectable when within these ranges. Alternatively, where the OSD is embedded in a polymeric security document, such as a polymeric banknote, the IR-absorbing component coupled to the OSD is present in an amount ranging from about 0.5 gsm to about 5 gsm, preferably, from about 2 gsm to about 3.5 gsm in order to enable detection. Suitable infrared detectors for detecting infrared rays in the near-, middle- and far-infrared wavelength ranges include: an LED or incandescent IR emitter in combination with a line scanner, CCD camera, photodiode or other similar detection device, The invention also, provides a use for the MrOSD to secure high security products. As such the MrOSD when coupled to a high security product, is able to thwart counterfeit attempts by being able to authenticate the high security product or aestheticize the high security product. For example, the MrOSD provides a predetermined characteristic Mr-signature to the high security product such that a missing or tampered OSD will be indicated by a recognizable difference in the Mr-signature that is distinguishable from the predetermined characteristic Mr-signature.

The invention also provides a method of making the MrOSD. In one embodiment, this method comprises (i) forming an OSD which at least comprises (a) a focusing layer of focusing elements, and (b) an image layer of image elements disposed relative to the focusing layer such that a synthetic image is projected by the OSD when the image elements are viewed through the focusing elements; and optionally (CO at least one additional layer: and (ii) introducing at least one Mr-component to the OSD. The Mr-component is as described herein. Likewise the Mr-component is coupled to the OSD as described herein.

When the inventive optical security device is used in paper (e.g., paper banknotes or documents), or applied to a surface of the paper, in order to be detectable (i.e., reliably measureable) the signal intensity or the height of the absorption/transmission peaks generated by the IR-reactive pigment is preferably greater than about 10 percent (%) (more preferably, greater than about 25%) of the noise level or signal intensity of the surrounding paper.

When the inventive optical security device is used in polymer sheet materials (e.g., polymer banknotes or documents), or applied to a surface of the polymer sheet material, in order to be detectable (i.e., reliably measureable) the signal intensity or height of the absorption/transmission peaks generated by the IR-reactive pigment is preferably greater than about 50% (more preferably, greater than about 75%) of the noise level or signal intensity of the surrounding polymer sheet material.

It is noted that while the IR or UV absorbance (or transmittance) of these Mr-components may, be detectable from the isolated optical security device, once the device is placed, for example, on or partially within a paper sheet material, the effect becomes scattered or weak, which may render the effect undetectable or not reliably measurable. In an exemplary embodiment of the present invention, the polymer(s) used to make the inventive optical security device is 100% transmissive, and the optical security device is present on or partially within a paper sheet material having a basis weight ranging from about 70 to about 110 grams per square meter ($g/m^2$ or gsm). In this exemplary embodiment, the characteristic IR-signature of the inventive MrOSD is reliably measureable in that the device absorbs or reflects more than 75 percent (%) of any near IR light when viewed in transmission (% T<25% from 750-950 nanometers (nm)).

In one exemplary embodiment, the IR-absorbing component is detectable in only the infrared region of the electromagnetic spectrum and is present in the form of a binary code. Two means for authentication are offered by way of this embodiment of the inventive optical security device, namely, the characteristic IR signature and the IR binary code.

In another exemplary embodiment, the IR-absorbing component is detectable in both the infrared and the visible regions of the electromagnetic spectrum and is present in the form of a binary code. Four means for authentication are offered by this embodiment, namely, the characteristic IR signature, the IR binary code, the visible appearance, and the visible binary code.

The UV-absorbing component used in the subject invention may be observable in only the ultraviolet region of the electromagnetic spectrum or it may be observable in both the ultraviolet and the visible regions of the electromagnetic spectrum, Similar to the IR-absorbing component, the UV-absorbing component may be present in a continuous manner or in the form of an intermittent pattern.

In one exemplary embodiment, the UV-absorbing component is observable in only the ultraviolet region of the electromagnetic spectrum and is present in the form of a binary code. Two means for authentication are offered by the inventive optical security device of this embodiment, namely, the characteristic UV signature and the UV binary code.

In another exemplary embodiment, the UV-absorbing component is observable in both the ultraviolet and the visible regions of the electromagnetic spectrum and is present in the form of a binary code. Four means for authentication are offered by this embodiment, namely, the characteristic UV signature, the UV binary code, the visible appearance, and the visible binary code.

In yet another exemplary embodiment, a combination of IR-absorbing and UV-absorbing components are present in the MrOSD. One or both of these components may also be observable in the visible region and may be present in either a continuous or intermittent pattern.

The MrOSD may be used in the form of, for example, a security strip, thread, patch, or overlay and mounted to a surface of, or partially embedded within a fibrous or non-fibrous (e.g., polymer) sheet material (e.g., banknote, passport, ID card, credit card, label), or commercial product (e.g., optical disks, CDs, DVDs, packages of medical drugs), etc., for authentication purposes. The inventive device may also be used in the form of a standalone product (e.g., substrate for subsequent printing or personalization), or in the form of a non-fibrous sheet material for use in making, for example, banknotes, passports, and the like, or it may adopt a thicker, more robust form for use as, for example, a base platform for an ID card, high value or other security document.

When used in the form of a security strip, thread, patch, or overlay, the total thickness of the inventive device is preferably less than about 50 microns (more preferably, less than about 45 microns, and most preferably, from about 10 to about 40 microns).

The security strips, threads, patches and overlays may be partially embedded within or mounted on a surface of a document. For partially embedded strips and threads, portions thereof are exposed at the surface of the document at spaced intervals along the length of the strip or thread at windows or apertures in the document.

The inventive optical security devices may be at least partially incorporated in security papers during manufacture by techniques commonly employed in the papermaking industry. For example, the inventive security device in the form of a strip or thread may be fed into a cylinder mould papermaking machine, cylinder vat machine, or similar machine of known type, resulting in partial embedment of the strip or thread within the body of the finished paper.

The security strips, threads, patches and overlays may also be adhered or bonded to a surface of a document with or without the use of an adhesive. Bonding without the use of an adhesive may be achieved using, for example, thermal welding techniques such as ultrasonic welding, vibration welding, and laser fusing. Adhesives for adhering the inventive devices to a surface of a document may be one of hot melt adhesives, heat activatable adhesives, water-activated adhesives, pressure sensitive adhesives, and polymeric laminating films. These adhesives are preferably crosslinkable in nature, such as UV cured acrylic or epoxy, with crosslinking achieved while the adhesive is in the melt phase.

Suitable documents into which the MrOSD may be integrated or otherwise embedded include those of any kind having financial value, such as banknotes or currency, bonds, checks, traveler's checks, lottery tickets, postage stamps, stock certificates, title deeds and the like, or identity documents, such as passports, ID cards, driving licenses and the like, or non-secure documents, such as labels. The MrOSD is also contemplated for use with consumer goods as well as bags or packaging used with consumer goods.

In another contemplated embodiment, the inventive device forms part of a label construction. The inventive device may be placed on the inside of a package, so that the synthetic image(s) remains visible.

When used in the form of a base platform for an ID card, high value or other security document, the total thickness of the inventive device is preferably less than or equal to about 1 millimeter (mm) including (but not limited to) thicknesses: ranging from about 200 to about 500 microns; ranging from about 50 to about 199 microns; and of less than about 50 microns.

While various embodiments of the present invention have been described above, it should be understood that they have been presented by way of example only, and not limitation. Thus, the breadth and scope of the present invention should not be limited by any of the exemplary embodiments.

The invention will be further clarified by reference to certain specific drawings reflecting certain specific embodiments of the present invention.

The Mr-component may be present in a continuous manner or in the form of an intermittent pattern. As best shown in FIG. 1, the intermittent pattern may be in the form of similar or different size horizontal bars (see FIGS. 1*a*, 1*d*, 1*e*), chevrons or zig zags (see FIG. 1*c*), angled bars (see FIG. 1*b*), shapes, indicia (see FIG. 1*f*), or the like, or combinations thereof.

Figure 1A:
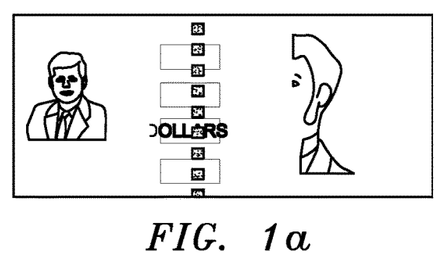
FIGS. 1a-f are top side images of exemplary embodiments of paper documents employing different optically variable security threads according to the present invention, as viewed in IR transmission, where the IR-absorbing component of the inventive optically variable security threads is present in the form of intermittent patterns, namely, similar or different size horizontal bars (FIGS. 1a, 1d, 1e), chevrons or zig zags (FIG. 1c), angled bars (FIG. 1b), and indicia (FIG. 1f).
Figure 1B:
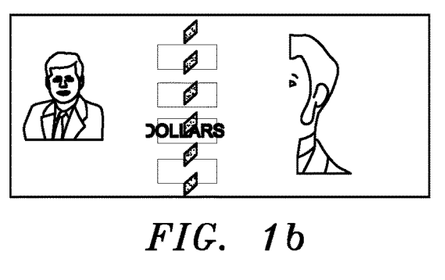
Figure 1C:
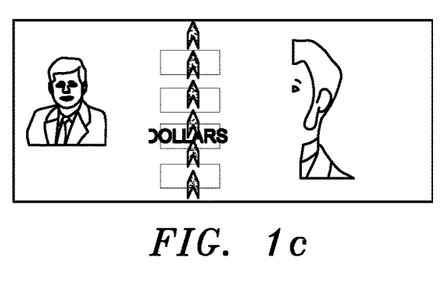
Figure 1D:
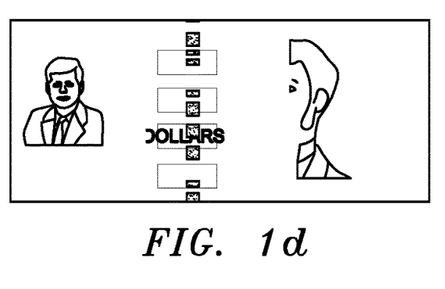
Figure 1E:
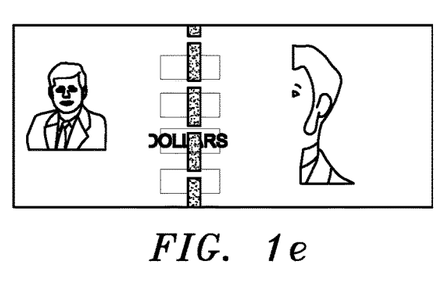
Figure 1F:
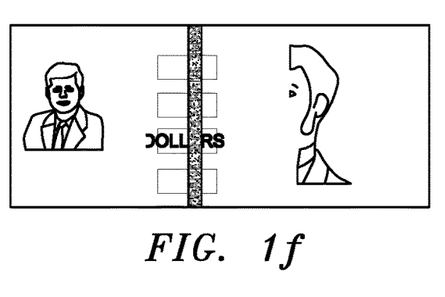
Figure 2:
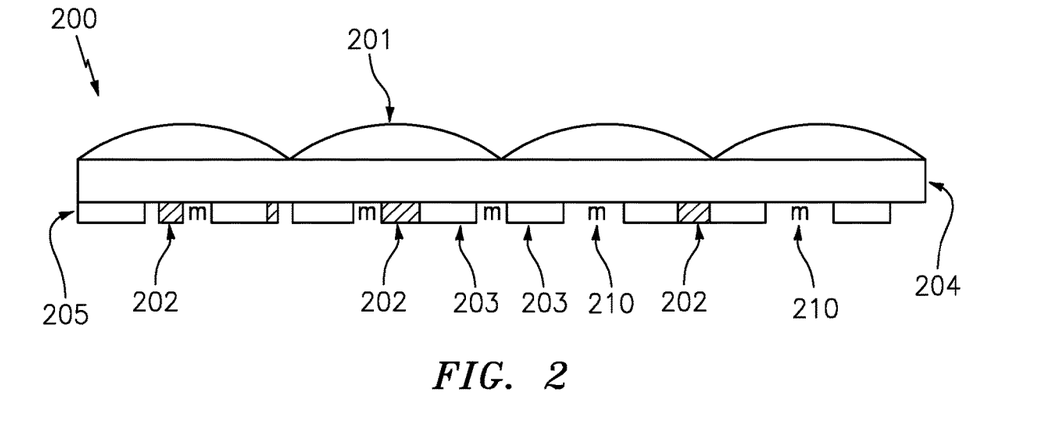
FIG. 2 is a cross-sectional view of a machine readable optical security device with the Mr-component within the image layer.

In one embodiment, as illustrated in FIG. 2, the Mr-component (210) of the MrOSD (200) is a patterned layer integrated into the image layer (205), where the MrOSD comprises a focusing layer of focusing elements (201) disposed over the image layer (205) of image elements (202) and surrounding solid regions (203). A spacer layer (204) is disposed between the focusing elements (201) and the image elements (202). Here the image elements are voids partially filled with a contrasting element.

Figure 3:
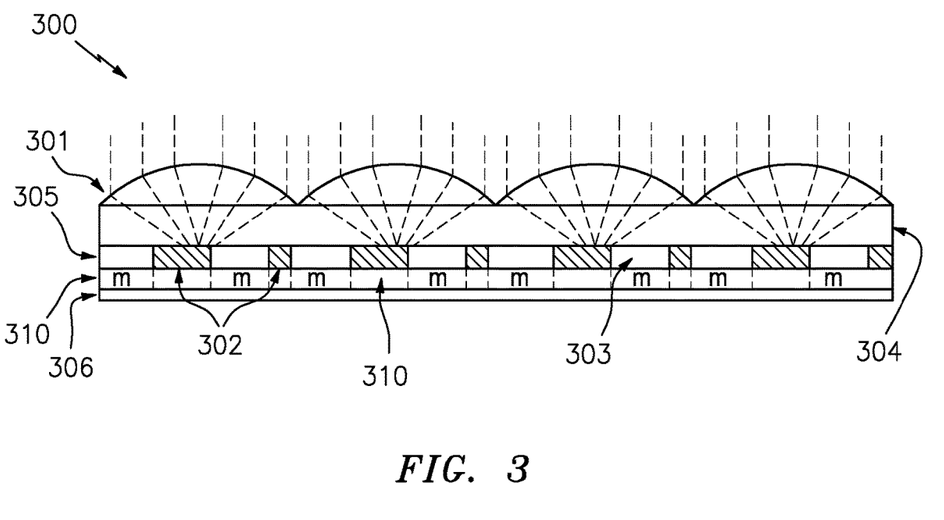
FIG. 3 is a cross-sectional view of a machine readable optical security device with the Mr-component as a discrete layer.

In a further exemplary embodiment, as depicted in FIG. 3, the Mr-component (310) of the MrOSD (300) is a discrete layer disposed between an image layer (305) of image elements (302) and an opacifying layer (306). The MrOSD (300) comprises a spacer layer (304) disposed between a focusing layer of focusing elements (301) and an image layer (305) of image elements (302) (filled voids) and surrounding solid regions (303).

Figure 4:
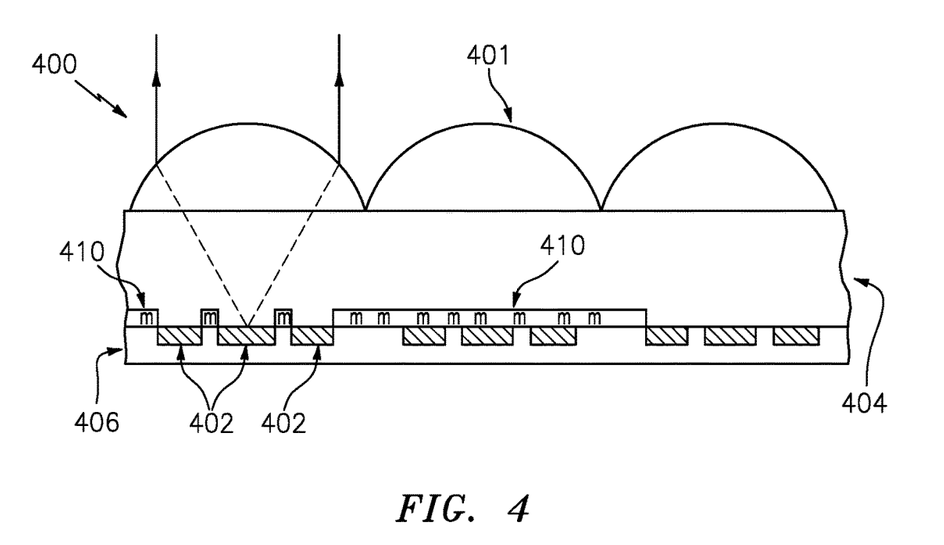
FIG. 4 is cross-sectional view of a machine readable optical security device with the Mr-component integrated as a pattern or indicia.

In another exemplary embodiment, as depicted in FIG. 4, the Mr-component (410) of the MrOSD (400) is integrated with the MrOSD as a patterned layer disposed between the MrOSD's spacer layer (404) and image layer. Here the image elements (402) are protrusions (402), which may be printed onto the spacer layer (404). Here the MrOSD comprises a spacer (404), which is disposed between a focusing layer of focusing elements (401) and an array of image elements (402). The MrOSD (400) also includes an additional layer (406) which functions as an adhesive layer.

Figure 5:
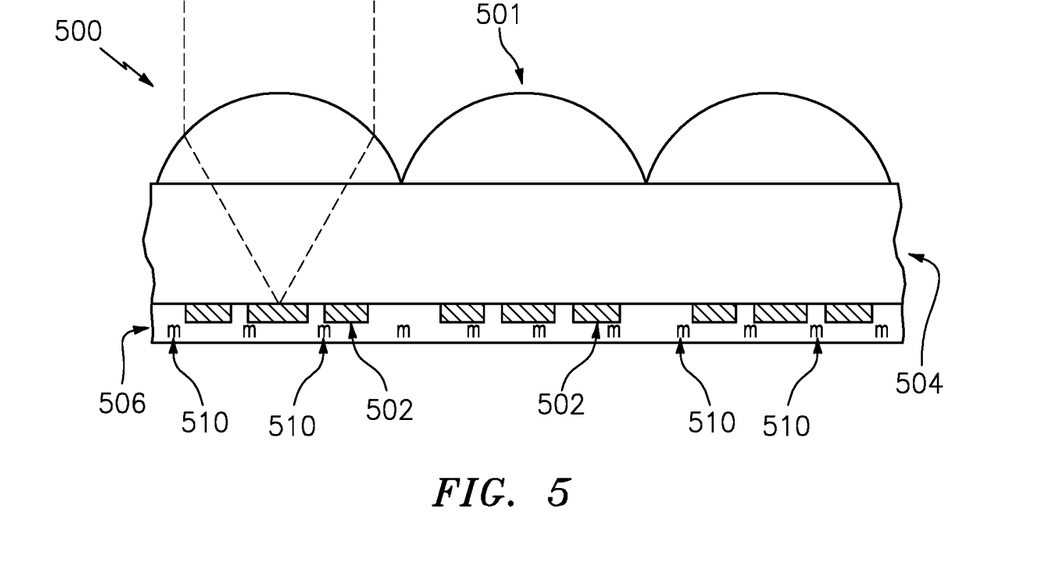
FIG. 5 is a cross-sectional view of a machine readable optical security device with the Mr-component randomly distributed throughout a layer of the OSD.

In another exemplary embodiment, as depicted in FIG. 5, the MrOSD (500) is as described in FIG. 4. The MrOSD (500) comprises a spacer layer (504), which is disposed between a focusing layer of focusing elements (501) and an array of image elements (502). Here the Mr-component (510) is integrated into the OSD by being distributed in an additional layer (506).

Figure 6:
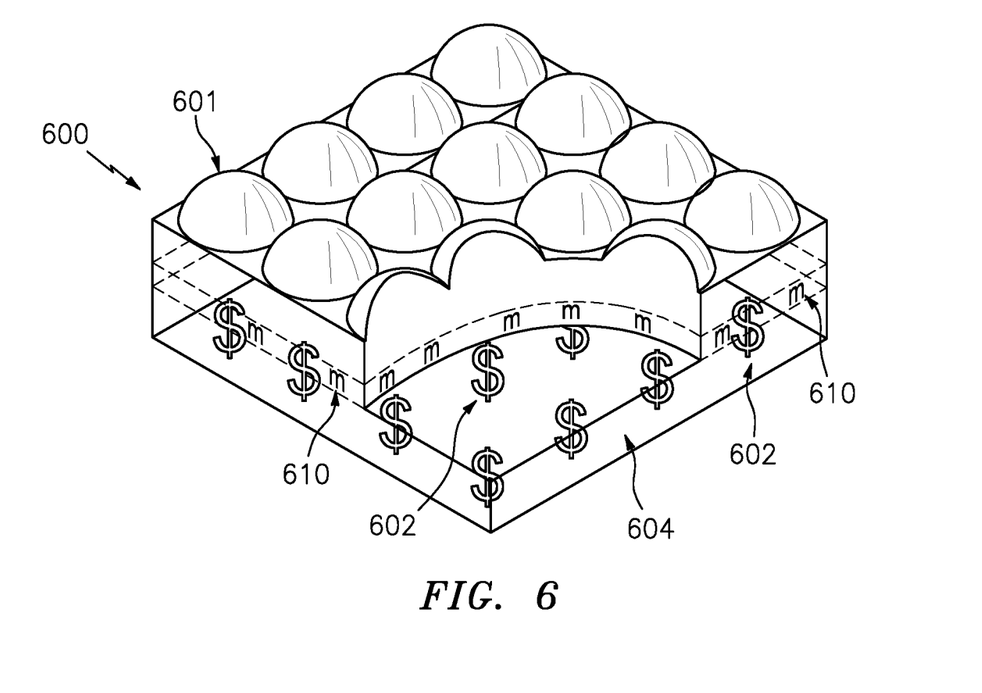
FIG. 6 is an isometric view of a machine readable optical security device with the Mr-component integrated with the ODS as a separate layer between the image layer and focusing layer.

The MrOSD, in one embodiment, is illustrated by FIG. 6, wherein the image elements (602) of MrOSD (600) are dollar signs arranged in an array in the image layer beneath the spacer layer (604). The spacer layer (604) is disposed between the image elements (602) and the focusing layer of focusing elements (601). Here, the Mr-component (610) is a discrete layer of an IR-absorber having very little absorption in the visible spectral range, but is detectable in the IR spectral range such that at least two Mr-signals are detectable in the invisible spectral range.

Figure 7:
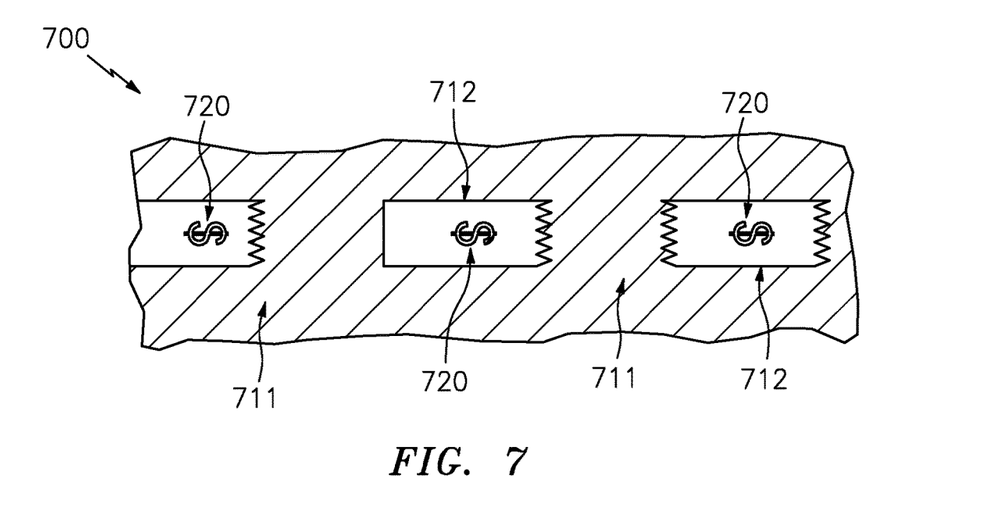
FIG. 7 is a plan view of a secured product presented as a banknote with a windowed thread displaying the synthetic image of the MrOSD being used to authenticate the banknote.

A secured product prepared using the MrOSD of FIG. 6 (marked with reference number (712)) is exemplified in FIG. 7. Here, the synthetic image (720) of MrOSD (600) projected by the image elements, when viewed through the focusing elements (601) of FIG. 6, is a dollar sign. The MrOSD (600) is coupled to a substrate (711) of the high security product (700). The high security product (700) is a banknote having the MrOSD (712) coupled to the banknote substrate as a partially embedded (e.g., windowed) thread, where the thread weaves in and out of the paper.

Figure 8:
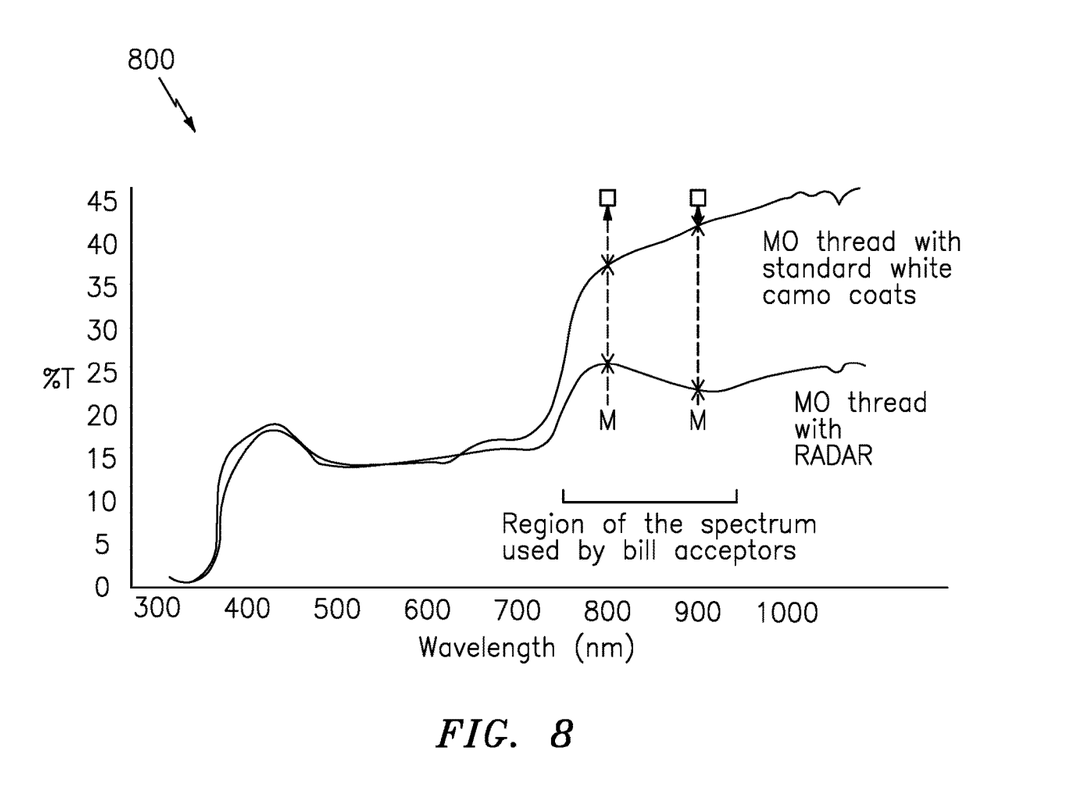
FIG. 8 is a graphical view of a predetermined Mr-signature with Mr-signals suitable for use in detecting the authenticity of secured product.

Presence of an authentic MrOSD can be confirmed by a signature detector. An authentic MrOSD will indicate a predetermined characteristic Mr-signature. An exemplary predetermined characteristic Mr-signature (800) is depicted by FIG. 8, wherein the top curve indicates a thread, such as an OSD without an Mr-component, while the bottom curve indicates a thread, such as an OSD with the Mr-component shown by the presence of the characteristic Mr-signature. As noted in the spectrograph of FIG. 8, the slope of the Mr-signals in the wavelength range of from 800 to 900 nm increases when the Mr-component is missing and decreases when the Mr-component is present as you increase the wavelength.

It should be understood that the Mr-component may alternatively be integrated into multiple layers of the OSD. Moreover, it is also contemplated herein that the focusing elements are reflective or a combination of refractive and reflective. Alternative predetermined Mr-signatures are also contemplated, including specific absorption or, emission at specific wavelengths.

What is claimed is:

1. A machine-readable optical security device (MrOSD) comprising:
    a multi-layer optical security device (OSD) comprising:
    a spacer layer comprising a first side and a second side;
    a layer of focusing elements disposed on the first side of the spacer layer;
    an array of image elements disposed on the second side of the spacer layer, wherein a synthetic image is projected by the array of image elements when viewed through the layer of focusing elements; and
    a machine-readable component (Mr-component) coupled to the spacer layer on the second side of the spacer layer at a density between 0.5 grams per square meter ("g/sm") to 5 gsm,
    wherein the array of image elements comprises a cured radiation curable polymer mixture, wherein the Mr-component comprises at least one of a machine readable phthalocyanine taggant added to the cured radiation curable polymer mixture prior to curing, wherein the machine readable phthalocyanine taggant comprises 30-70% by weight of an ink vehicle added to the radiation curable polymer mixture, wherein the Mr-component does not interfere with the synthetic image, and wherein the Mr-component absorbs light at a first wavelength in a non-visible spectrum, and emits light at a second wavelength in the non-visible spectrum.

2. The MrOSD of claim 1, wherein the Mr-component is a first IR-component imparting an Mr-signature which includes at least two Mr-signals within an IR spectral range.

3. The MrOSD of claim 1, wherein the Mr-component is a first UV-component imparting an Mr-signature which includes at least two Mr-signals within a UV spectral range.

4. The MrOSD of claim 1, wherein the Mr-component provides at least two Mr-signals within an invisible spectral range.

5. The MrOSD of claim 4, wherein the at least two Mr-signals are within an infrared spectral range.

6. The MrOSD of claim 4, wherein the at least two Mr-signals are within an ultraviolet spectral range.

7. The MrOSD of claim 1, wherein the Mr-component provides a machine-readable signal in a near infrared spectral range.

8. The MrOSD of claim 1, wherein the Mr-component imparts an Mr-signature that includes a first absorption at the first wavelength in the non-visible spectrum and a second absorption at a third wavelength in the non-visible spectrum where the first absorption is lower than the second absorption and the first wavelength is lower than the third wavelength.

9. The MrOSD of claim 1, wherein image elements of the array of image elements comprise voids filled or coated with a contrasting material.

10. The MrOSD of claim 1, wherein the MR-component comprises an IR-taggant selected from a substituted phthalocyanine, a naphthalocyanine, a metal-containing phthalocyanine or a poly-substituted phthalocyanine.

11. The MrOSD of claim 1, wherein the MR-component is an IR-taggant comprising a benzenethiol-substituted copper-phthalocyanine that is added to the cured radiation curable polymer mixture prior to curing.

12. The MrOSD of claim 1, wherein the Mr-component comprises an IR taggant which absorbs infrared light of the first wavelength in the non-visible spectrum and emits light at the second wavelength in the non-visible spectrum.

13. The MrOSD of claim 1, wherein the Mr-component comprises a UV taggant which absorbs ultraviolet light of the first wavelength in the non-visible spectrum and emits light at the second wavelength in the non-visible spectrum.

* * * * *